United States Patent [19]

Bowles

[11] Patent Number: 5,757,633
[45] Date of Patent: May 26, 1998

[54] HIGH EFFICIENCY MULTISTEP SINEWAVE SYNTHESIZER

[75] Inventor: Edward E. Bowles, Naka-Machi, Japan

[73] Assignee: General Atomics, San Diego, Calif.

[21] Appl. No.: 755,847

[22] Filed: Nov. 26, 1996

Related U.S. Application Data

[60] Provisional application No. 60/007,936 Dec. 4, 1995.
[51] Int. Cl.[6] .............................. H02M 1/08; H02M 1/12
[52] U.S. Cl. ........................ 363/71; 363/41; 363/98
[58] Field of Search ............................ 363/71, 97, 43, 363/98, 42, 41, 65

[56] References Cited

U.S. PATENT DOCUMENTS

| | | | |
|---|---|---|---|
| 4,117,364 | 9/1978 | Baker | 363/43 |
| 5,121,315 | 6/1992 | Moriya | 363/65 |
| 5,198,971 | 3/1993 | Recker et al. | 363/71 |

*Primary Examiner*—Peter S. Wong
*Assistant Examiner*—Rajnikant B. Patel
*Attorney, Agent, or Firm*—Fitch, Even, Tabin & Flannery

[57] ABSTRACT

A multistep inverter uses multiple inverter H-bridges connected in series to piecewise approximate a sine wave. The inverter H-bridges are bypassed or switched into service as required for sinewave synthesis. After a step is switched in, it creates its portion of the sine wave. Each step is further smoothed using pulse width modulation which leads to a smoother sine wave with the consequent advantages of lower distortion, smaller and lighter filtering circuits, and lower conversion losses during transistor switching.

10 Claims, 9 Drawing Sheets

POSITIVE V
SWITCHES 1 AND 4 ON

0 V
SWITCHES 3 AND 4 ON

NEGATIVE V
SWITCHES 2 AND 3 ON

SIMULATED SINEWAVE WITH TWENTY
DISCRETE VOLTAGE STEPS

PWM SMOOTHING OF VOLTAGE STEPS

HIGH EFFICIENCY MULTISTEP SINEWAVE SYNTHESIZER

This application claims the benefit of U.S. provisional application Ser. No. 60/007.936, filed Dec. 4, 1996, which application is incorporated herein by reference.

BACKGROUND OF THE INVENTION

The present invention relates to sinewave synthesizers, and more particularly to a multistep inverter capable of efficiently converting a direct current (dc) signal into an alternating current (ac) signal with low harmonic distortion without the use of large output filters.

It is known in the art of sinewave synthesis to pulse width modulate (PWM) a dc signal to produce an approximation of a sine wave. It is also known in the art to operate a transistor in the linear region to produce a pure sine wave from a dc source. It is further known in the art to use multistep inverter bridges to piecewise approximate a sine wave by summing discrete voltage steps to construct segments of the sine wave.

Thus far, however, there has been no sinewave synthesizer, of which Applicant is aware, which uses a multistep inverter to piecewise approximate a sine wave using voltage steps while further pulse width modulating these voltage steps in order to produce a smooth sinusoidal waveform. All of the prior art sinewave synthesizers of which Applicant is aware employ pulse width modulation to approximate the entire sine wave rather than only a voltage step segment of the sine wave as in the present invention.

During pulse width modulation (PWM) of a dc signal to produce an ac signal, a transistor, e.g., a field effect transistor (FET), switches on and off to produce pulses of constant amplitude but of varying widths, i.e., durations. The width of each pulse is proportional to the amplitude of the portion of the waveform or signal being approximated. The amplitude of the pulses, although constant, must be of sufficient magnitude to approximate the desired signal. Therefore, prior art sinewave synthesizers which used pulse width modulation to approximate an entire sine wave required pulses of relatively large amplitudes in order to approximate the peaks of the sine waves. Because PWM switching losses are proportional to the amplitude of the pulses, the transistors of prior art synthesizers suffered from high PWM switching losses. In addition, because of the high pulse voltages required, prior art sinewave synthesizers were susceptible to electromagnetic interference and required high pulse width modulation frequencies to achieve low output distortion levels. This high pulse width modulation frequency further contributed to high switching losses in the transistors of the prior art sinewave synthesizers.

Another type of sinewave synthesizer known in the art is one which operates a transistor in the linear region to produce a pure sine wave from a dc source. Although these types of sinewave synthesizers are capable of producing a high quality, low harmonic distortion sine wave, they exhibit very poor efficiency. FIG. 1 shows how a transistor operating in the linear region can produce a pure sine wave from a dc source. As shown in FIG. 1, the transistor drop during the lowest point of the sine wave is equal to the peak-to-peak amplitude of the sine wave. For sinewave synthesizers requiring high power outputs, e.g., 5000 watts, and high sinewave amplitudes, e.g., 120 volts rms, this transistor drop results in high transistor power dissipation and greatly decreases the power efficiency of the system. In addition, high transistor power dissipation results in high heat dissipation which requires large heat sinks to cool the transistors and direct the heat away from surrounding components.

Prior art sinewave synthesizers which used discrete voltage steps to piecewise approximate a sine wave did not further employ pulse width modulation of the discrete voltage steps to improve the sine wave as in the present invention. Therefore, prior art sinewave synthesizers exhibited poor harmonic distortion characteristics and required large output filter circuits to improve the output waveform. These large output filters are typically relatively heavy and require a large amount of space. In particular, some applications of sinewave synthesizers, e.g., a power supply for a commercial or military aircraft, require that the size and weight of the sinewave synthesizer be kept as small as possible. If a heavy and large output filter must be used with the sinewave synthesizer in order to filter out the unwanted harmonic components, then such sinewave synthesizer is not well suited for such light weight and small size applications.

Thus, what is needed is a sinewave synthesizer capable of more efficiently producing a high quality sine wave with low harmonic distortion and low electromagnetic interference (EMI) susceptibility, without the need for large output filters to improve the output waveform.

SUMMARY OF THE INVENTION

The present invention addresses the above and other needs by providing a multistep inverter that uses multiple inverter bridges connected in series to piecewise approximate a sine wave. The inverter bridges are bypassed or switched into service as required for sinewave synthesis. After a step is switched in, it creates its portion of the sine wave. Each step is further smoothed using pulse width modulation which leads to a smoother sine wave with the consequent advantages of lower distortion, smaller and lighter filtering circuits, and lower conversion losses during transistor switching.

In one embodiment, the present invention can be characterized as a multi-step inverter for converting dc power to ac power. The multistep inverter employs a primary inverter for converting a source of dc power to an intermediate ac power signal; a transformer for coupling the intermediate ac power signal to a plurality of secondary windings, a rectifier coupled to each secondary winding for rectifying the ac signal appearing thereat to produce a rectified secondary power signal, a plurality of secondary inverters, each having first and second output lines, for converting each rectified secondary power signal, in response to a control signal, to one of three output voltages appearing across the first and second output lines: a positive voltage +V, a zero voltage 0V, or a negative voltage −V. The plurality of secondary inverters are stacked together in a series circuit relationship so that the first output line of a 1st secondary inverter is connected to one side of a load, the second output line of the 1st secondary inverter is connected to the first output line of a 2d secondary inverter, the second output line of the 2d secondary inverter is connected to the first output line of a 3d secondary inverter, and so on for n different secondary inverters, where n is an integer of at least two, with the second output line of the nth secondary inverter being connected to the other side of the load. The multistep inverter further employs a control circuit for generating the control signal applied to each of the plurality of secondary inverters in a way that combines select combinations of the +V, 0V, and −V outputs from the plurality of secondary inverters in series across the load so that the signal applied across the load approximates a sine wave (or other desired wave shape).

The control circuit generates the control signals applied to each of the plurality of secondary inverters so that the signal applied across the load appears, e.g., as a stair-stepped sine wave, with pulse-width modulation used to smooth each step of the sine wave.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
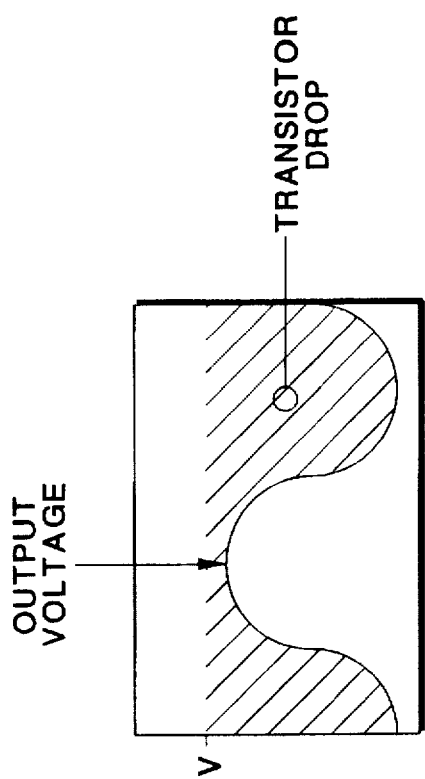
FIG. 1 shows a transistor operating in the linear region to produce a pure sine wave from a DC source.
Figure 1:
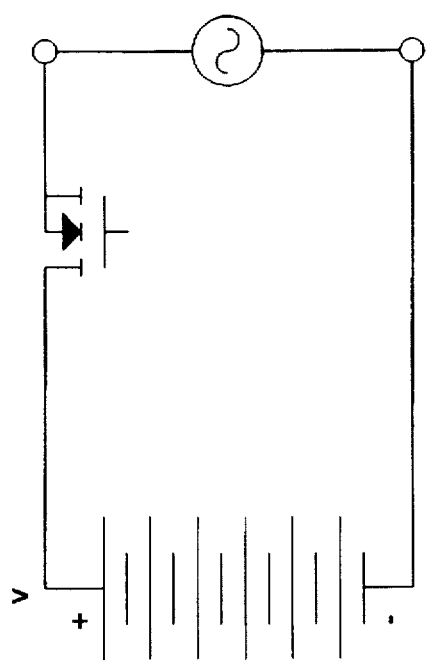

FIG. 1 was described previously in the background portion of the application.

Figure 2:
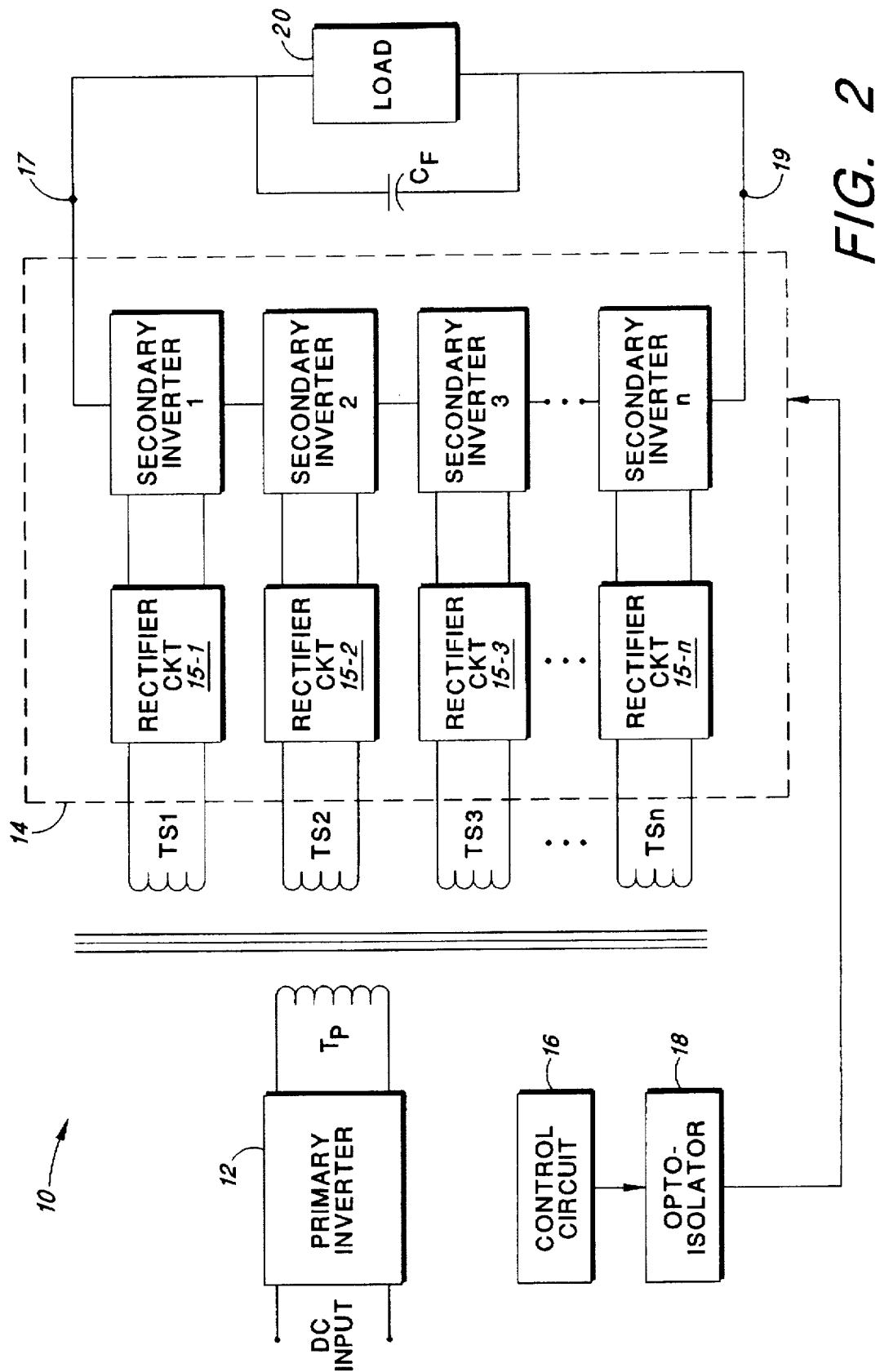
FIG. 2 shows a functional block diagram of a multistep inverter having n multistep inverter bridges connected in series.

Referring to FIG. 2, a functional block diagram of one embodiment of a single phase, multistep sinewave synthesizer 10 is shown. Primary inverter 12 receives a direct current (dc) input signal from a dc power source (not shown). For one embodiment—power systems for military aircraft—the dc power source may comprise a dc power bus of, e.g., 170 vdc. The primary inverter 12 converts the dc input into an intermediate alternating current (ac) signal. This intermediate ac signal is transformer coupled to a multistep inverter 14 which consists of a plurality of secondary inverters connected in series. As shown in FIG. 2, transformer coupling is accomplished by a primary transformer winding Tp and secondary transformer windings Ts1–Tsn. Each of the secondary transformer windings Ts1–Tsn are connected to a respective rectifier circuit 15-1, 15-2, . . . 15-n, each of which converts the transformer coupled ac signal appearing across the secondary winding Ts1–Tsn to a dc signal, within a multistep inverter 14. Any suitable transformer may be used to realize the primary winding Tp and each of the secondary windings Ts1–Tsn. For example, the transformer may be a planar transformer, as is known in the art.

Each of the secondary inverters of multistep inverter 14 are connected in series and, in combination, produce an ac signal that appears across a load 20. Each of the secondary invertors, when considered alone, converts the induced ac signal across its respective secondary winding into one of three DC output voltages: a positive voltage +V, a zero voltage 0v, or a negative voltage –V. Whether the dc output voltage is positive, negative, or zero depends on the control signals received from control circuit 16. It is the combination of these dc voltages when added together in series, that creates the signal that appears across the load 20, as explained more fully below. In a preferred embodiment, control circuit 16 is electrically isolated from multistep inverter 14 by means of an optiosolator circuit 18. Electrically isolating two interacting circuits by means of optical coupling is well known in the art. It is noted that a control circuit may be designed to drive either a single 4-stage secondary inverter to produce a single-phase ac signal across a load, or alternatively such control circuit may be designed to drive three separate 4-stage secondary inverters in order to produce a three-phase ac signal across the load.

As can be seen from FIG. 2, the output terminals 17 and 19 of the multistep sinewave synthesizer 10 extend from the 1st and nth secondary inverters of multistep inverter 14. The load 20, which is not part of the present invention, is shown connected between the output terminals 17 and 19 of the multistep sinewave synthesizer 10. As required, a high frequency filter capacitor $C_f$ may be placed across the load.

The control circuit 16 controls the output voltages of each of the secondary inverters of multistep inverter 14 such that the signal applied across the load 20 approximates a sine wave. In the present embodiment, this sine wave approximation is accomplished by independently controlling the output voltage states of the secondary inverters of multistep inverter 14 such that the sum of the output voltages approximates a sine wave having multiple discrete voltage steps. By further pulse width modulating each of the voltage steps, the approximated sine wave is further smoothed to provide a high quality, low distortion sine wave.

Figure 3:
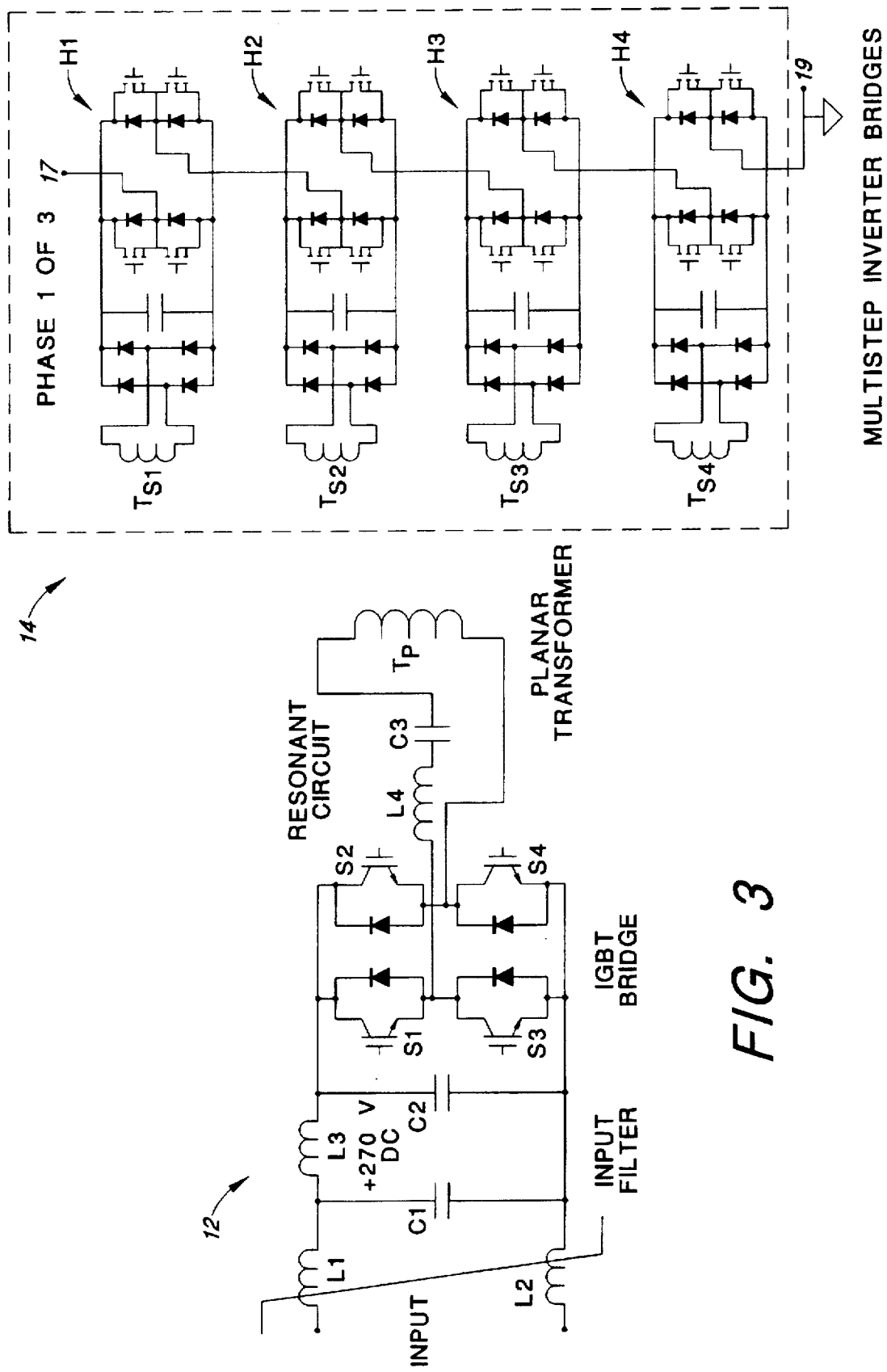
FIG. 3 is a circuit level diagram of one embodiment of the multistep inverter of FIG. 2.

Referring to FIG. 3, a circuit level diagram of one embodiment of the single phase multistep (e.g., 4-step) sinewave synthesizer 10 of FIG. 2 is shown. The primary inverter 12 (FIG. 2) includes input filter circuitry having inductors L1, L2, and L3 and capacitors C1 and C2. The primary inverter 12 (FIG. 2) further includes an inverter bridge, e.g., an insultated gate bipolar transistor (IGBT), for alternating the DC current input at a prescribed frequency, e.g., 100 KHz, to provide an intermediate ac signal to primary transformer winding Tp. The IGBT bridge is comprised of four switches S1–S4 connected in an H-bridge configuration as shown in FIG. 3. In one embodiment, each of the switches S1–S4 is a bipolar junction transistor having a reverse biased diode connected across the collector and emitter junctions to protect the transistors against spurious signals and reverse conduction during switching. Inductor L4 and capacitor C3 form a resonant circuit which resonates at the prescribed frequency to allow the IGBT's to swtich at zero voltage and reduce harmonic distortion in the ac signal provided to primary transformer winding Lp. As shown in FIG. 3, the ac signal across primary transformer winding Tp is inductively coupled to secondary windings Ts1–Ts4. The induced ac signals across secondary windings Ts1–Ts4 are then full-bridge rectified by rectifying circuitry connected to the leads of each of the secondary windings Ts1–Ts4. The rectifying circuits each consist of four diodes and a capacitor configured as shown in FIG. 3. Other rectifying circuits could also be used (e.g., using two diodes and a center-tapped secondary transformer) as are known in the art, or equivalents thereof. Each of the rectifying circuits rectifies the ac signal induced in the respective secondary winding to produce a dc signal that is applied to the multistep inverter bridges H1–H4 of multistep inverter 14.

Figure 8:
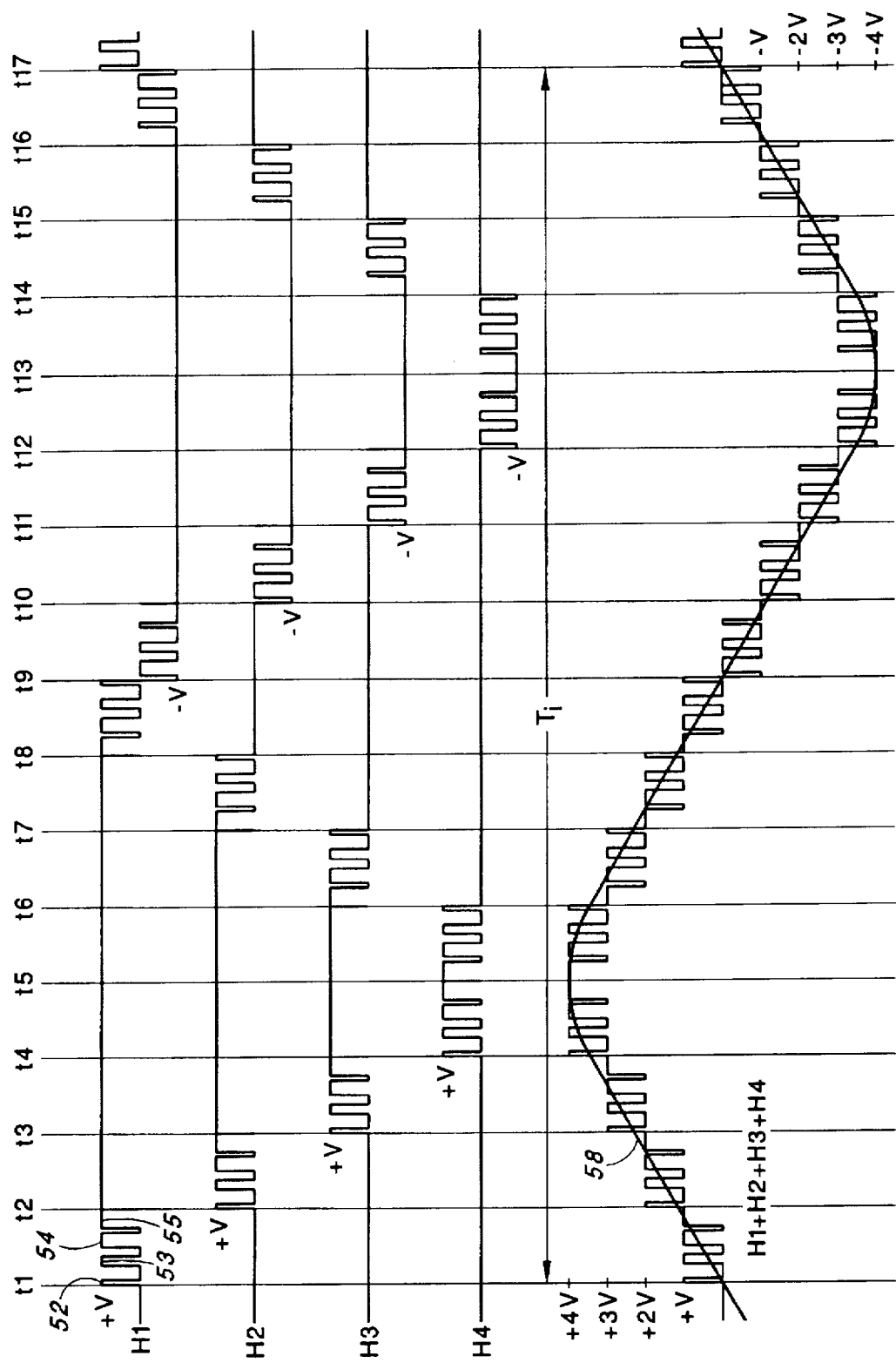
FIG. 8 is a timing waveform diagram that teaches how the control signal may be used to control a 4-state single phase inverter of the type shown in FIG. 3 in order to produce a sinusoidal-type waveform.

The multistep inverter 14 places multiple, full bridge circuits H1–H4, referred to herein as H-bridges, in a series circuit relationship. In one embodiment, each H-bridge consists of four field effect transistors (FET's) each having a reverse biased diode connected across the source and drain to protect the transistor from spurious signals and reverse conduction during switching. The FET's are connected in an H-bridge configuration as shown in FIG. 3. Each H-bridge is independently controlled by a control circuit (not shown) to provide three output voltage states: a positive, negative, or zero voltage state as described below. The control circuit synchronously and selectively turns on the FET's of each H-bridge in order to provide the desired output voltage states. FIG. 8, described below, shows a timing waveform diagram that teaches the manner in which control signals may be used to control the H-bridges of the multistep inverter 14 in order to produce a desired output waveform, e.g., a sine wave.

Figure 4A:
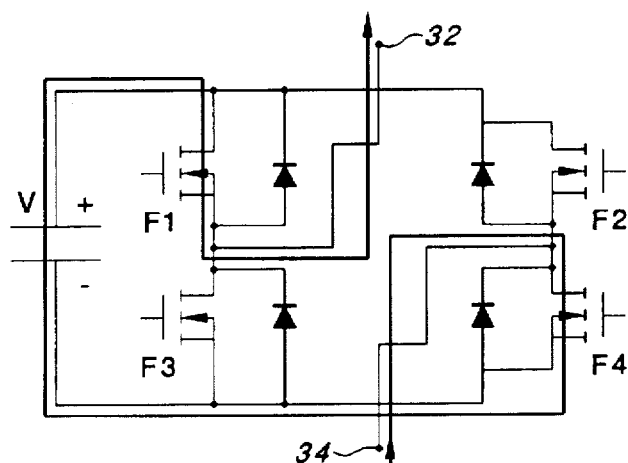
FIGS. 4A–4C show three possible switch states for an H-bridge circuit of the type used with the invention.
Figure 4B:
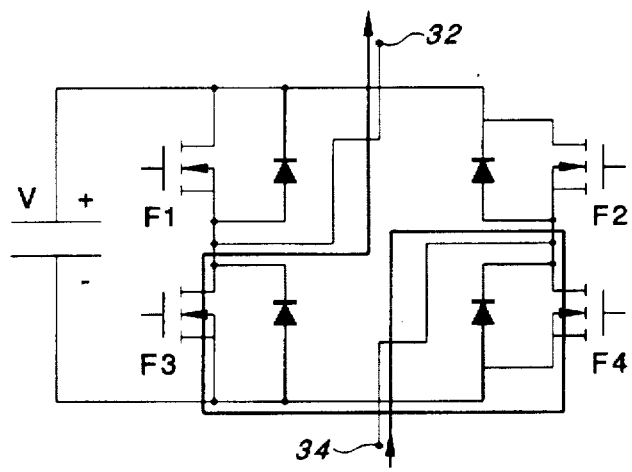
Figure 4C:
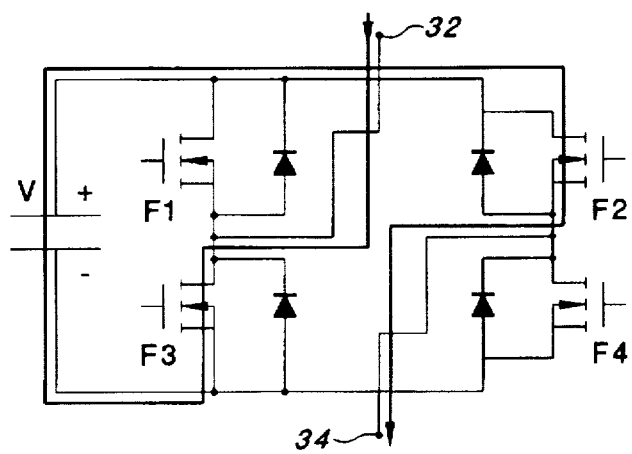

FIGS. 4A–4C show the three possible switch states for an H-bridge. The dark lines with arrows are meant to show the direction of current flow through the circuit, depending on the switch states. In FIG. 4A, switches F1 and F4 are turned on and the output voltage, i.e., the voltage appearing across output terminals 32 and 34 of the H-bridge 30 is equal to V. For the bypass state, shown in FIG. 4B, the output voltage is zero when switch F4 and diode F3 are turned on. This is because the bridge's dc voltage source is bypassed by the current flow. The last state, shown in FIG. 4C, allows for a negative output voltage when switches F2 and F3 are turned on.

The bypass, 0 volt, state of an H-bridge allows several H bridges to be connected in series with the resulting voltage sum being independently controlled by selecting the operating state of the individual H-bridges.

Figure 5:
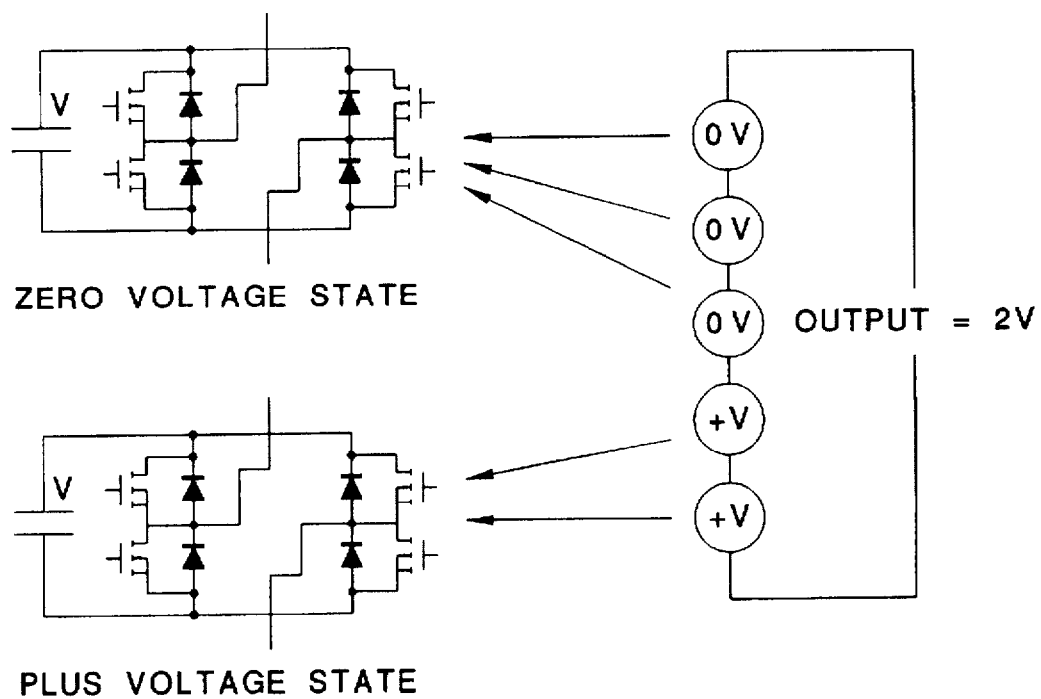
FIG. 5 show some of the different voltage states possible with five bridges in series.
Figure 5:
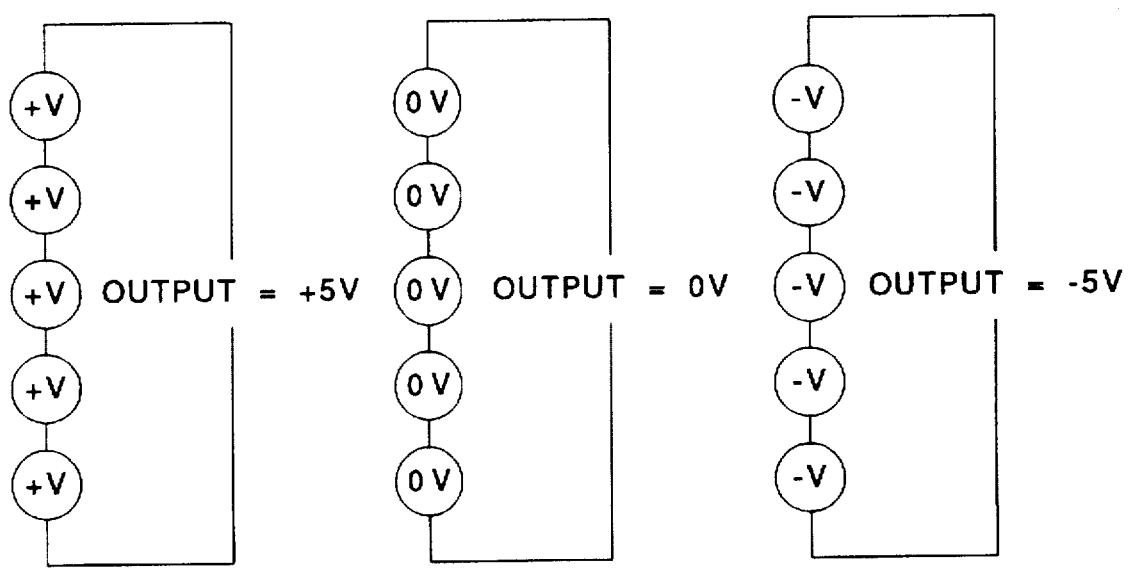
Figure 6:
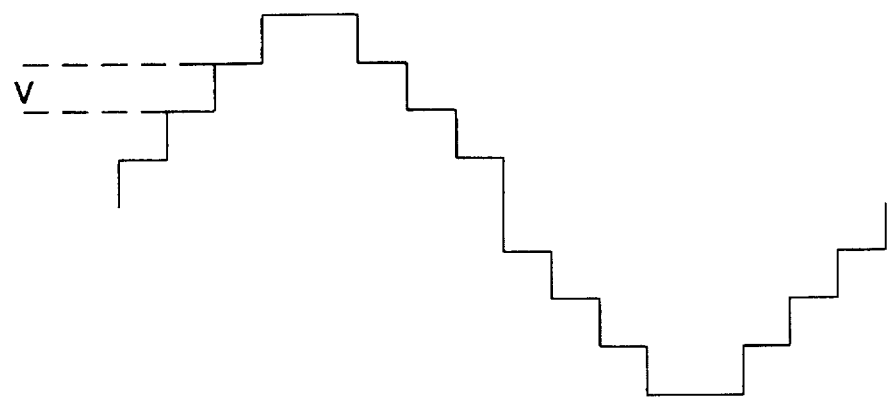
FIG. 6 shows a simulated sine wave with twenty discrete voltage steps.
Figure 7:
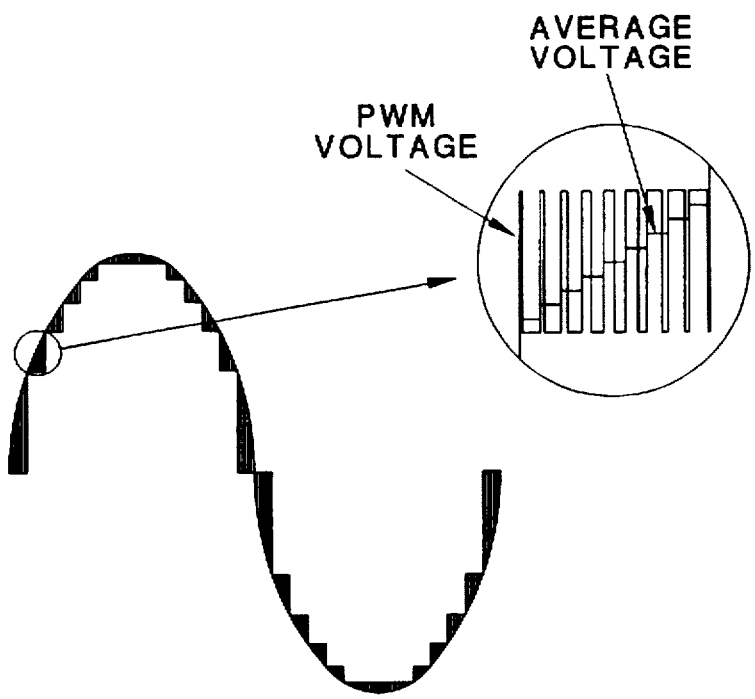
FIG. 7 shows pulse width modulation smoothing of the voltage steps shown in FIG. 6.

If, for example, five full H-bridges were connected in series, with independent voltage supplies V, then eleven voltage states between −5V and +5V would be possible, as represented in FIG. 5. Sequencing the turn-on of these five voltage steps can simulate a sine wave with twenty discrete voltage steps, as shown in FIG. 6. Each of these twenty steps may then be smoothed by pulse width modulation as shown in FIG. 7.

With five discrete voltage steps, each transistor operating in the pulse width modulation (PWM) mode need only switch 20% of the voltage for 20% of the time. This reduces the PWM switching losses per transistor by a factor of twenty five. With low switching losses, high PWM frequencies can be used to smooth each step. The combination of low PWM amplitude (20% of normal PWM) and high PWM frequency (up to 200 KHz with this design) produces a high quality sine wave with little filtering. Therefore massive filtering circuits are not required.

Additionally, reduced switching losses equates to higher efficiency and lower heat conduction by each transistor. Low power loss per surface mount transistor allows heat to be conducted away through the ceramic circuit board on which the transistors are mounted. Therefore, space consuming heatsinks are not required with the present invention, allowing the overall size and weight of the sinewave synthesizer of the present invention to be reduced.

Figure 9:
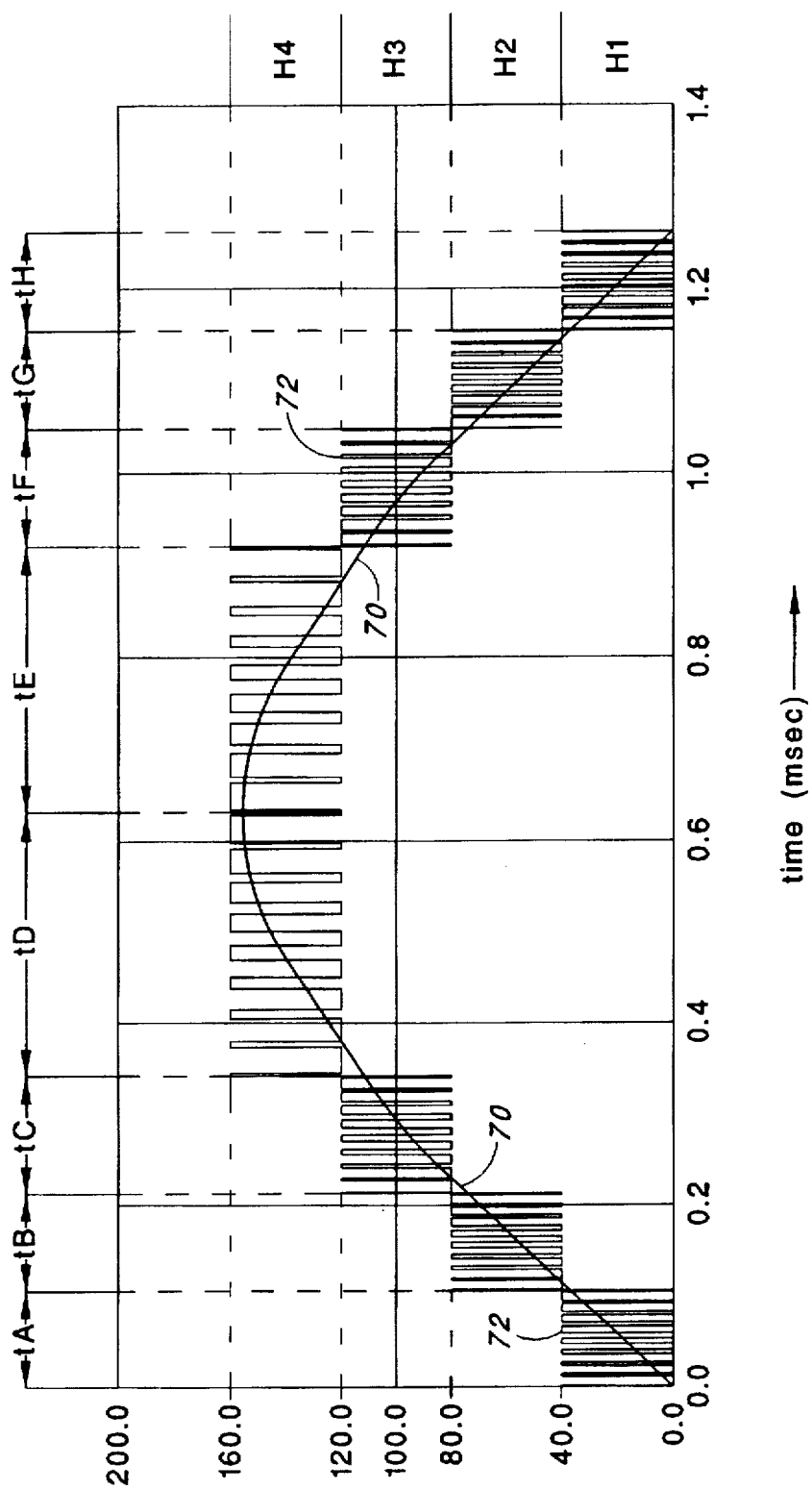
FIG. 9 shows a 4-stage single phase voltage output with and without filtering used to produce a sine wave.

Turning next to FIG. 8, there is shown a timing waveform diagram that teaches how the control signal may be used to control a 4-state single phase inverter of the type shown in FIG. 3 in order to produce a sinusoidal-type waveform. In FIG. 8, the output voltages of each of the four H-bridge circuits H1, H2, H3 and H4 used in FIG. 3, as well as the sum of such output voltages (H1+H2+H3+H4), are illustrated as a function of time. As explained previously, such output voltages may assume one of three values depending upon the state of the respective H-bridge circuit. These three values are: +V, 0, and −V. The manner of achieving these three output voltages was explained previously in connection with FIGS. 4A–4C above. For purposes of FIG. 8, it is assumed that the individual FET switches F1, F2, F3, and F4 within each H-bridge H1, H2, H3 and/or H4, are controlled as required in order to produce the output voltages shown in FIG. 8. For simplicity, all that is shown in FIG. 8 is the output voltage from each H-bridge circuit. A person of skill in the art would be able to fashion the appropriate control signals for each of the individual FET switches F1, F2, F3 and F4 within each H-bridge circuit in order to achieve the output voltages shown in FIG. 8, or other desired output voltages (e.g., as shown in FIG. 9).

As seen in FIG. 8, when a 4-step sinewave synthesizer is employed, as shown in FIG. 3, the period T of the desired output sine wave is divided into sixteen time segments, t1, t2, t3, . . . t16. At time t1, the H-bridge circuits H2, H3, and H4 remain OFF (0 volts), and the H-bridge circuit H1 is turned ON (+V) and OFF (0 volts) in accordance with a desired pulse-width modulation (PWM) scheme for the duration of the time increment t1. The PWM, for example, causes H1 to turn ON with increasingly wider positive pulses, i.e., pulses switching from 0 volts to +V volts. Four such positive pulses 52, 53, 54, and 55 are illustrated in FIG. 8, each of increasing width. Such sequence of pulses, when averaged, or filtered, creates an output voltage waveform 58 (heavy line) that increases in amplitude throughout the time increment t1, as shown in the bottom waveform diagram of FIG. 8 (representing the sum of the H1, H2, H3 and H4 outputs). It is to be understood that the use of four pulses with increasingly wider pulse widths in this manner is only exemplary, and any number of pulses may be used during the time increment t1, of varying widths, in order to cause the output voltage 58 to assume a desired shape or value.

At time t2, the H1-bridge circuit turns ON (+V output) and stays on until time t8. The H3- and H4-bridge circuits remain OFF (0 volts). The H2-bridge circuit turns ON and OFF in accordance with the desired PWM scheme with increasingly wider positive pulses. This causes the output voltage waveform 58 to continue to increase in amplitude throughout the time increment t2, with the output voltage being the sum of H1(+V), H2(+V/0v), H3(0v) and H4(0v).

At time t3, the H2-bridge circuit turns ON (+V output) and stays on until time t7. The H4-bridge circuit remains OFF (0v). The H3-bridge circuit turns ON and OFF in accordance with the desired PWM scheme with increasingly wider positive pulses. This causes the output voltage waveform 58 to continue to increase in amplitude throughout the time increment t3, with the output voltage being the sum of H1(+V), H2(+V), H3(+V/0v) and H4(0v).

At time t4, the H3-bridge circuit turns ON (+V output) and stays on until time t6. The H4-bridge circuit turns ON and OFF in accordance with the desired PWM scheme with increasingly wider positive pulses. This causes the output voltage waveform 58 to continue to increase in amplitude throughout the time increment t4, with the output voltage being the sum of H1(+V), H2(+V), H3(+V) and H4(+V/0v).

At time t5, the peak of the output voltage waveform 58 has been reached (+4V), and a reverse process begins. That is, during the time increment beginning at t5, the H1-, H2-, and H3-bridge circuits remain ON (+V), and the H4-bridge circuit starts to turn OFF by turning OFF and ON with increasingly narrower pulses in accordance with a desired PWM scheme. This causes the output voltage waveform 58 to start to decrease in amplitude throughout the time increment t5, with the output voltage being the sum of H1(+V), H2(+V), H3(+V) and H4(+V/0v).

At time t6, the H1-, and H2-bridge circuits remain ON (+V), the H4-bridge circuit remains OFF (0v), and the H3-bridge circuit starts to turn OFF by turning OFF and ON with increasingly narrower pulses in accordance with the desired PWM scheme. This causes the output voltage waveform 58 to continue to decrease in amplitude throughout the time increment t6, with the output voltage being the sum of H1(+V), H2(+V), H3(+V/0v) and H4(0v).

Similarly, at time t7, the H1-bridge circuit remains ON (+V), the H3- and H4-bridge circuits remain OFF (0v), and the H2-bridge circuit starts to turn OFF by turning OFF and ON with increasingly narrower pulses in accordance with the desired PWM scheme. This causes the output voltage waveform 58 to continue to decrease in amplitude throughout the time increment t7, with the output voltage being the sum of H1(+V), H2(+V/0v), H3(0v) and H4(0v).

Likewise, at time t8, the H2-, H3-, and H4-bridge circuits remain OFF (0v), and the H1-bridge circuit starts to turn OFF by turning OFF and ON with increasingly narrower pulses in accordance with the desired PWM scheme. This causes the output voltage waveform 58 to continue to decrease in amplitude throughout the time increment t8, with the output voltage being the sum of H1(+V/0v), H2(0v), H3(0v) and H4(0v).

As seen in FIG. 8, as the time t9 is reached, the output voltage 58 has cycled through its positive half cycle. Thus, at time t9, a negative half cycle begins. This is realized in the same manner as the positive half cycle described above, except that the individual H-bridge circuits H1, H2, H3, and H4 are tuned ON to their negative states (−V), or pulse-width modulated between their zero state (0v) and their negative state (−V).

It is noted that in one embodiment of the invention, a slightly more complicated timing pattern may be employed to make the duty cycle of the H1-, H2-, H-3 and H-4 bridge circuits equal during each cycle of the output sinusoidal-type waveform.

It is further noted that the output voltage waveform 58 shown in FIG. 8 is a sinusoidal-type waveform, but it is not necessarily a true sine wave. A true sine wave (or at least a good approximation of a true sine wave) is realized as depicted in FIG. 9. Shown in FIG. 9 is a 4-stage single phase voltage output with filtering (waveform 70) and without filtering (waveform 72) used to produce a 110 VAC, 400 Hz sine wave. Because four steps are used, i.e., 4 H-bridge circuits, and a peak voltage of roughly 160 volts is assumed, then each step provides approximately a 40 volt step size to the overall output waveform.

It is additionally noted that only one-half of the period of the sine wave (the positive half) is shown in FIG. 9. The duration of one-half of a period of a 400 Hz signal is 1.25 milliseconds (msec). Like the waveform shown in FIG. 8, the half period is divided into eight time increments, labeled tA, tB, tC, tD, tE, tF, tG, and tH. However, unlike the waveform shown in FIG. 8, the time increments of FIG. 9 are not necessarily of equal duration. That is, in FIG. 9, the time increment tA (and tH), during which the H1-bridge circuit is being turned ON and OFF in accordance with a desired PWM scheme and the H2-, H3- and H4-bridge circuits are all OFF, is about 0.1 msec in duration. Likewise, the time increment tB (and tG), during which the H1-bridge is ON, the H3- and H4-bridge circuits are OFF, and the H2-bridge circuit is being turned ON and OFF in accordance with the desired PWM scheme, is also about 0.10 msec. However, the time increment tC (and tF), during which the H1- and H2-bridge circuits are ON, the H4-bridge circuit is OFF, and the H3-bridge circuit is being turned ON and OFF in accordance with the desired PWM scheme, is about 0.13 msec. Further, the time increment tD (and tE), during which the H1-, H2- and H3-bridge circuits are ON, and the H4-bridge circuit is being turned ON and OFF in accordance with the desired PWM scheme, is on the order of 0.30 msec.

The realization of the "true" sine wave 70 shown in FIG. 9, and the sinusoidal type waveform 58 shown in FIG. 8, highlights the versatility of different output waveforms that may be achieved using a a multistep inverter in accordance with the present invention. Almost any desired waveform shape can be achieved using the invention simply by controlling when and for how long the individual H-bridge stages are turned on positively (+V), negatively (−V), or OFF (0 volts).

Figure 10:
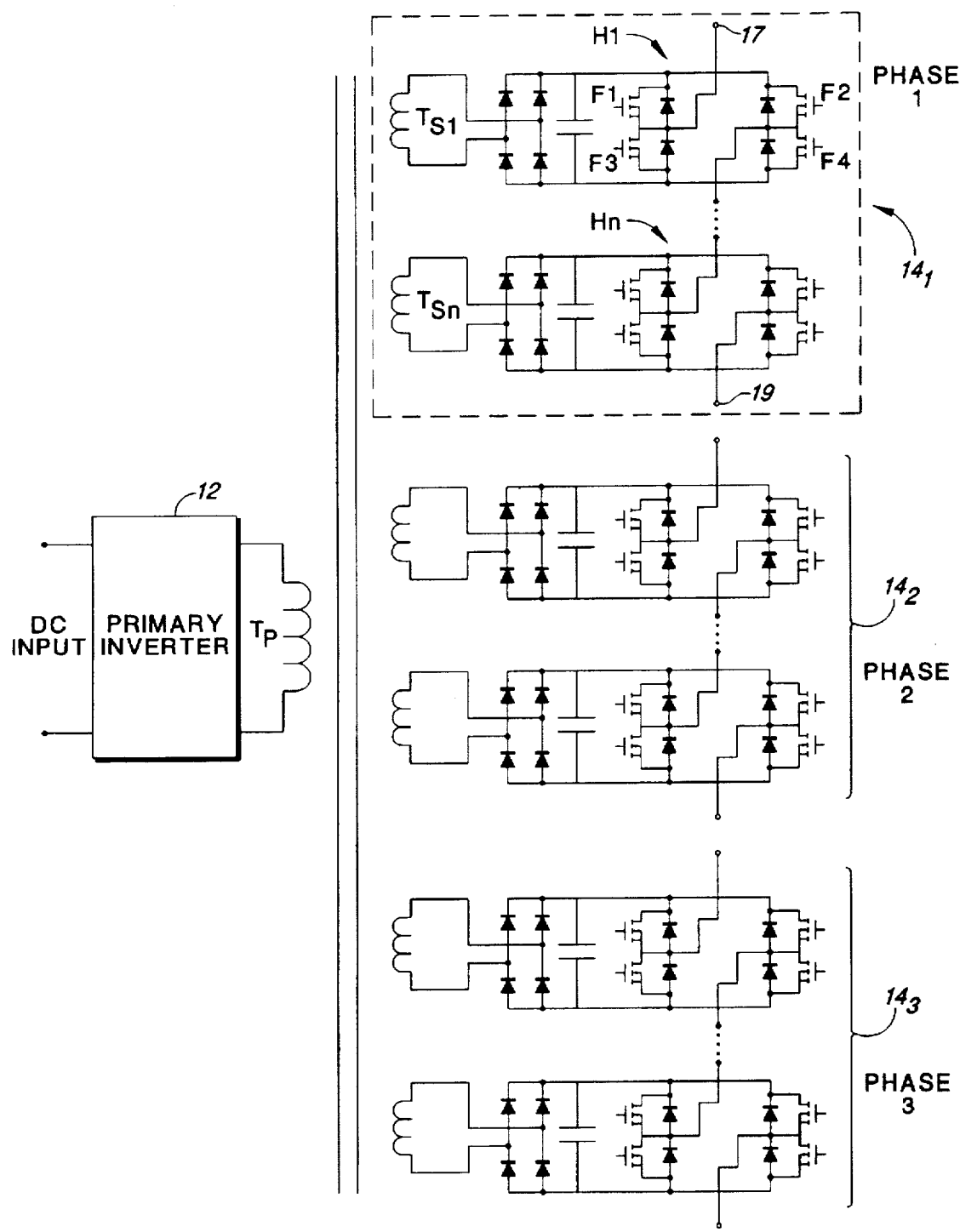
FIG. 10 is a circuit level diagram of the preferred embodiment of a three phase, multistep inverter connected in a Wye configuration.

Referring next to FIG. 10, a preferred embodiment of the present invention having three 4-step inverters placed in a Wye configuration to provide a three phase AC output is shown. Each of the three multistep inverters output an AC waveform as described for a single multistep inverter above. Primary inverter 12 receives a dc input signal and converts this signal into an intermediate ac signal to be applied across primary transformer winding Tp. The intermediate ac signal is transformer coupled to three multistep inverters $14_1$, $14_2$ or $14_3$, each representing a phase of a 3-phase ac output signal. Transformer coupling is accomplished via primary transformer winding Tp and secondary transformer windings Ts1–Tsn of each multistep inverter 14. The induced ac signal across secondary transformer windings Ts1–Tsn are then rectified by a rectifying circuit to provide a dc signal to H-bridges H1–Hn.

Alternatively, each of three separate primary inverters may receive a dc input signal and convert this signal into a respective intermediate ac signal which is applied across a respective primary transformer winding. Each intermediate ac signal is then transformer coupled to one of three multistep inverters $14_1$, $14_2$ or $14_3$, each representing a phase of a 3-phase ac output signal. Transformer coupling is accomplished via primary transformer windings Tp1, Tp2, Tp3 and secondary transformer windings Ts1–Tsn of each multistep inverter $14_i$, where i=1, 2 or 3. The induced ac signal across secondary transformer windings Ts1–Tsn are then rectified by a rectifying circuit to provide a dc signal to H-bridge circuits H1–Hn of each multistep inverter.

Each H-bridge circuit $14_1$, $14_2$ and $14_3$, employs four transistors, typically field effect transistors (FET's), connected in an H-bridge configuration as shown in FIG. 10. A control circuit (not shown) controls the switching of these transistors so that each H-bridge circuit produces one of three voltage states: a positive, negative, or zero voltage state, as described above. By independently controlling each H-bridge and summing the respective voltages of all the H-bridges within a multistep inverter 14, a sinewave is approximated. The approximated sine wave is further smoothed by pulse width modulating the voltage steps of the approximated sine wave. Similarly, the multistep inverters for producing phase 2 and phase 3 sine waves, produce voltage stepped sine waves which are smoothed by pulse width modulation of the voltage steps in order to provide a 3-phase, ac output signal.

In one application of the present invention, the three phase sinewave synthesizer converts a 270 Vdc input power source into a three phase, 400 Hz, AC output signal. Each of the three multistep inverters output an AC waveform with a line to neutral voltage of 115 V rms, and with a phase displacement of 120 degrees relative to each other.

While the invention herein disclosed has been described by means of specific embodiments and applications thereof, numerous modifications and variations could be made thereto by those skilled in the art without departing from the scope of the invention set forth in the claims.

What is claimed is:

1. A multistep inverter for converting dc power to ac power comprising:

primary inverter means for converting a source of dc power to an intermediate ac power signal;

a plurality of secondary inverter means, each having first and second output lines, for converting the intermediate ac power signal, in response to a control signal, to one of three output voltages appearing across the first and second output lines: a positive voltage +V, a zero voltage 0V, or a negative voltage −V;

the plurality of secondary inverter means being stacked together in series circuit relationship so that the first output line of a 1st secondary inverter means is connected to one side of a load, the second output line of the 1st secondary inverter means is connected to the first output line of a 2d secondary inverter means, the second output line of the 2d secondary inverter means is connected to the first output line of a 3d secondary inverter means, and so on for n different secondary inverter means, where n is an integer of at least two, with the second output line of the nth secondary inverter means being connected to the other side of the load; and control means for generating the control signal applied to each of the plurality of secondary inverter means in a way that combines select combinations of the +V, 0V, and −V outputs from the plurality of secondary inverter means in series across the load so that the signal applied across the load approximates a sine wave.

2. The multistep inverter as set forth in claim 1 wherein the control means generates the control signals applied to each of the plurality of second inverter means so that the signal applied across the load appears as a stair-stepped sine wave, with pulse-width modulation used to smooth each step of the sine wave.

3. The multistep inverter as set forth in claim 1 wherein each of the plurality of secondary inverter means comprises:

rectifier means for converting the intermediate ac power signal to a stepped-down dc power signal, the stepped down dc power signal comprising a dc voltage $V_n$ that is equal to approximately 1/n of a maximum peak output voltage of a desired output ac power signal, where n equals the number of second inverter means that are used within the multi-step inverter; and a switchable bridge circuit comprising: first, second, third and fourth switches connected in an H-bridge circuit configuration, with each of the first, second, third and fourth switches having first and second output terminals and a control terminal, with the first and second output terminals of each switch being connected together to turn the respective switch ON in response to the control signal applied to the control terminal assuming a first state, and with the first and second output terminals being open (or not connected together) to turn the respective switch OFF in response to the control signal assuming a second state, and further wherein the first and second switches each have their respective first output terminals connected to one side or polarity of the dc voltage $V_n$, and the third and fourth switches each have their respective second output terminals connected to the other side or polarity of the dc voltage $V_n$, and further wherein the second output terminal of the first switch is connected to the first output terminal of the third switch to form a first output line of the switchable bridge circuit, and the second output terminal of the second switch is connected to the first output terminal of the fourth switch to form a second output line of the switchable bridge circuit; and wherein the control means generates a respective control signal to be applied to the control terminal of each of the first, second, third, and fourth switches of each switchable bridge circuit so that the switchable bridge circuit assumes one of three states:

a first state comprising a positive V state wherein the first and fourth switches are turned ON and the second and third switches are turned OFF so that the voltage $V_n$, appears across the first and second output lines of the switchable bridge circuit with the first output line being positive with respect to the second output line, a second state comprising a zero state wherein the third and fourth switches are turned ON and the first and second switches are turned OFF so that zero volts appears across the first and second output lines, and the first and second output lines are connected together through the ON third and fourth switches, and a third state comprising a negative V state wherein the second and third switches are turned ON and the first and fourth switches are turned OFF so that the voltage $V_n$ appears across the first and second output lines of the switchable bridge circuit with the first output line being negative with respect to the second output line.

4. A multistep synthesizer for converting dc power to ac power comprising:

a primary inverter circuit that converts a source of dc power to an intermediate ac power signal;

a transformer having primary and secondary windings, the intermediate ac power signal being applied to the primary winding;

a plurality of secondary rectifier circuits, each connected to one of the secondary windings of the transformer, each secondary rectifier circuit having means for rectifying an ac signal received through the respective secondary winding to provide an intermediate dc voltage;

a plurality of secondary bridge circuits, each secondary bridge circuit being connected to a respective one of the plurality of secondary rectifier circuits, each secondary bridge circuit having first and second output lines, each secondary bridge circuit having switches which, in response to a control signal, convert the intermediate dc voltage generated by the secondary rectifier circuit to one of three output voltages which appear across its first and second output lines: a positive voltage +V, a zero voltage 0V, or a negative voltage −V; and wherein the plurality of secondary bridge circuits are stacked together so that the first output line of a 1st secondary bridge is connected to one side of a load, the second output line of the first bridge circuit is connected to the first output line of a 2d secondary bridge circuit, the second output line of the 2d secondary bridge circuit is connected to the first output line of a 3d secondary bridge circuit, and so on, for n different secondary bridge circuits, where n is an integer of at least two, with the second output line of the nth secondary bridge circuit being connected to the other side of the load;

wherein the +V, 0V, and −V outputs from the plurality of secondary bridge circuits are combined in series across the load so that the signal applied across the load approximates a specified wave shape.

5. The multistep synthesizer of claim 4 wherein the specified wave shape comprises a sine wave.

6. The multistep synthesizer of claim 4 wherein the secondary bridge circuit comprises a switchable bridge circuit having first, second, third and fourth transistor switches connected in an H-bridge configuration.

7. The multistep synthesizer of claim 6 wherein the switchable bridge circuit assumes one of three states as a function of the control signal: a first state wherein the first and fourth transistor switches are turned ON so as to make the first output line have a positive potential relative to the second output line while the second and third transistor switches are turned OFF; a second state wherein the third and fourth transistor switches are turned ON so as to connect the first output line to the second output line while the first and second transistor switches are turned OFF, and a third state wherein the second and third transistor switches are turned ON so as to make the first output line have a negative potential relative to the second output line while the first and fourth transistor switches are turned OFF.

8. The multistep synthesizer of claim 6 wherein three sets of secondary bridge circuits are employed to produce a three phase ac signal across the load.

9. The multistep synthesizer of claim 8 wherein the multistep inverter generates a three phase ac sine wave signal from an input dc power source of about 270 Vdc, the three-phase ac sine wave having a frequency of about 400 Hz, each phase of the three-phase ac sine wave having a line to neutral voltage of about 115 V rms, and having a phase displacement of about 120 degrees relative to the other phases of the three-phase sine wave.

10. A method of synthesizing an ac waveform having a desired waveshape from a source of dc power comprising:

converting the source of dc power to an intermediate ac power signal;

coupling the intermediate ac power signal through a transformer to a plurality of secondary windings of the transformer;

rectifying the ac signal at each secondary winding of the transformer to produce a rectified secondary power signal;

converting each rectified secondary power signal to one of three output voltages: a positive voltage +V, a zero voltage 0V, or a negative voltage −V, wherein the one of three voltages appears across first and second output lines of each of a plurality of switched bridged circuits;

stacking the switched bridged circuits in a series circuit relationship across a load by connecting the first output line of a 1st secondary inverter to one side of the load, connecting the second output line of the 1st secondary inverter to the first output line of a 2d secondary inverter, connecting the second output line of the 2d secondary inverter to the first output line of a 3d secondary inverter, and so on for n different secondary inverters, where n is an integer of at least two, and connecting the second output line of the nth secondary inverter to the other side of the load; and combining selected combinations of the +V, 0V, and −V outputs from the plurality of switched bridged circuits connected in series across the load so that the signal applied across the load approximates the desired waveshape.

* * * * *